Figure 5:
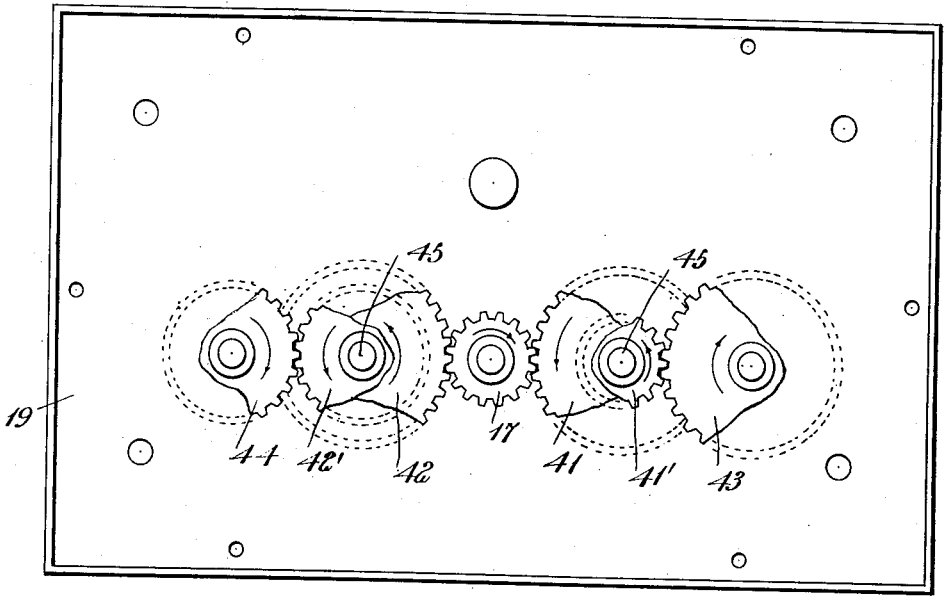

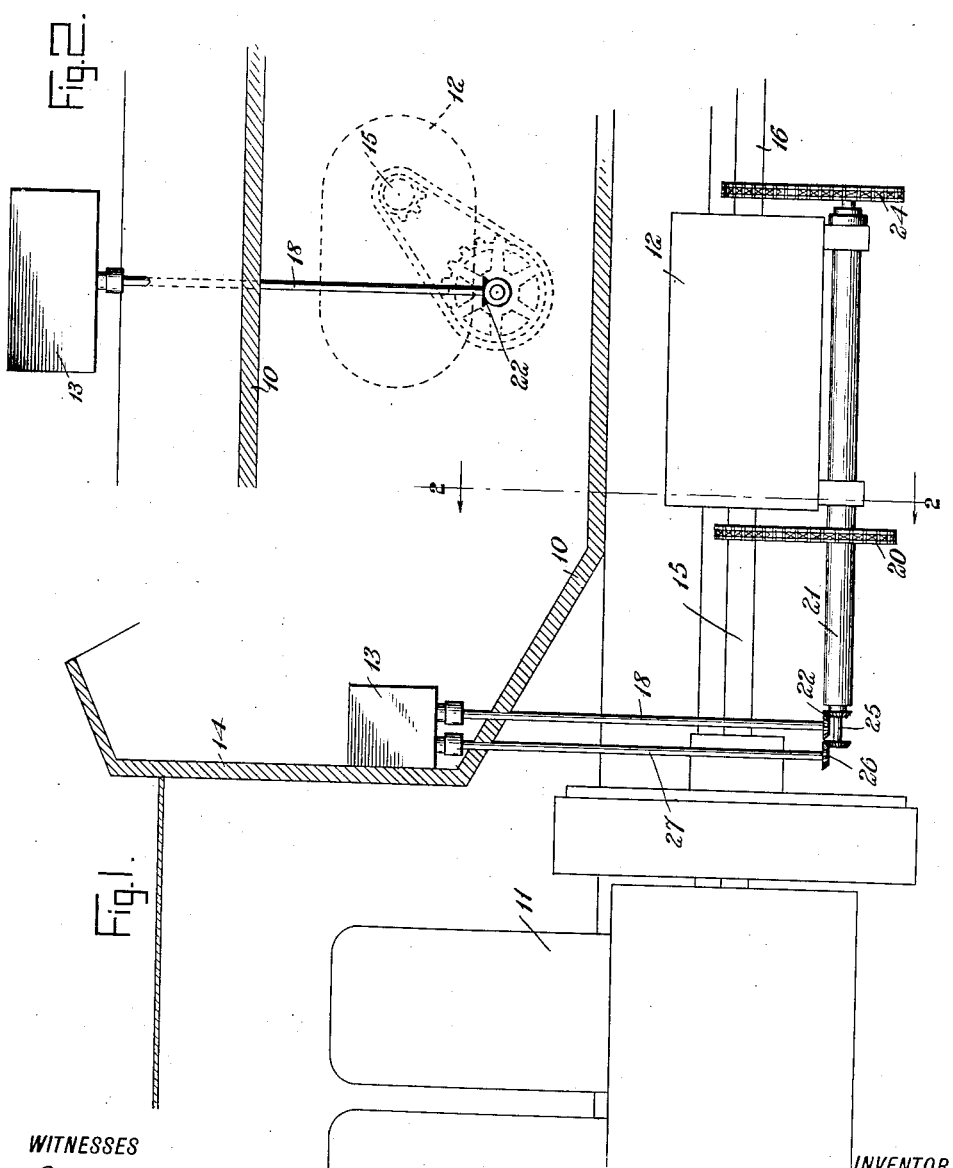

F. W. WOODHULL.
TRANSMISSION GEAR INDICATOR.
APPLICATION FILED NOV. 1, 1913.
1,161,572.  
Patented Nov. 23, 1915.  
4 SHEETS—SHEET 2.
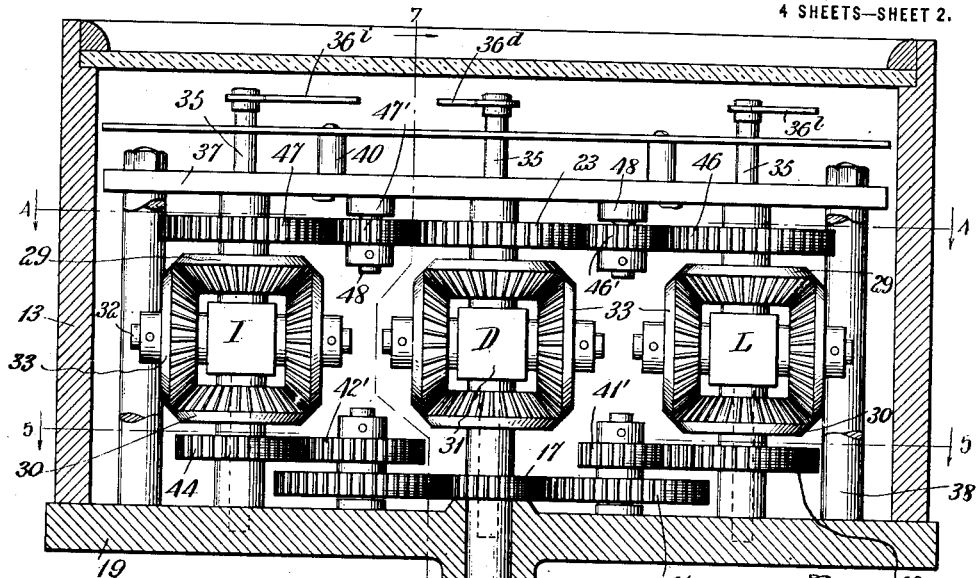
Fig. 3.
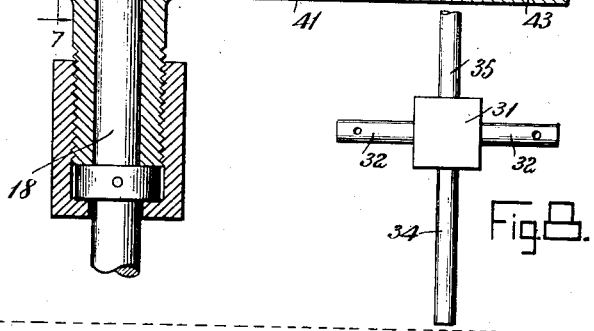
Fig. 4. Fig. 8.
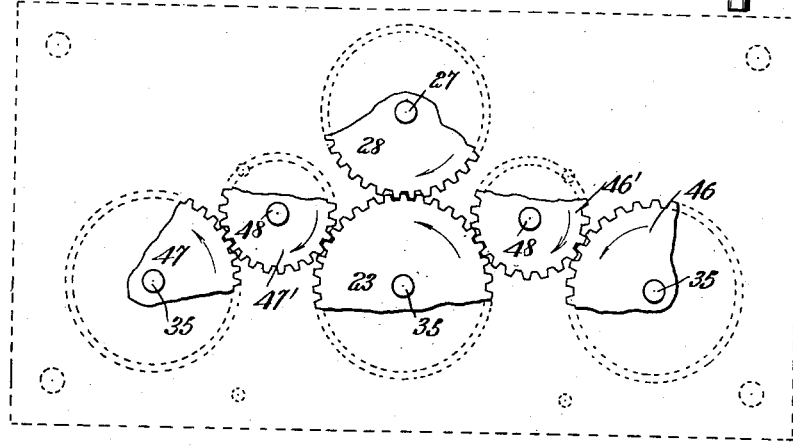
WITNESSES  
C. K. Reichenbach.  
Geo. L. Beeler
INVENTOR  
Frederick W. Woodhull  
BY Munn & Co  
ATTORNEYS

F. W. WOODHULL.
TRANSMISSION GEAR INDICATOR.
APPLICATION FILED NOV. 1, 1913.

1,161,572.

Patented Nov. 23, 1915.
4 SHEETS—SHEET 3.

WITNESSES
INVENTOR
Frederick W. Woodhull
BY
ATTORNEYS

F. W. WOODHULL.
TRANSMISSION GEAR INDICATOR.
APPLICATION FILED NOV. 1, 1913.
1,161,572.
Patented Nov. 23, 1915.
4 SHEETS—SHEET 4.
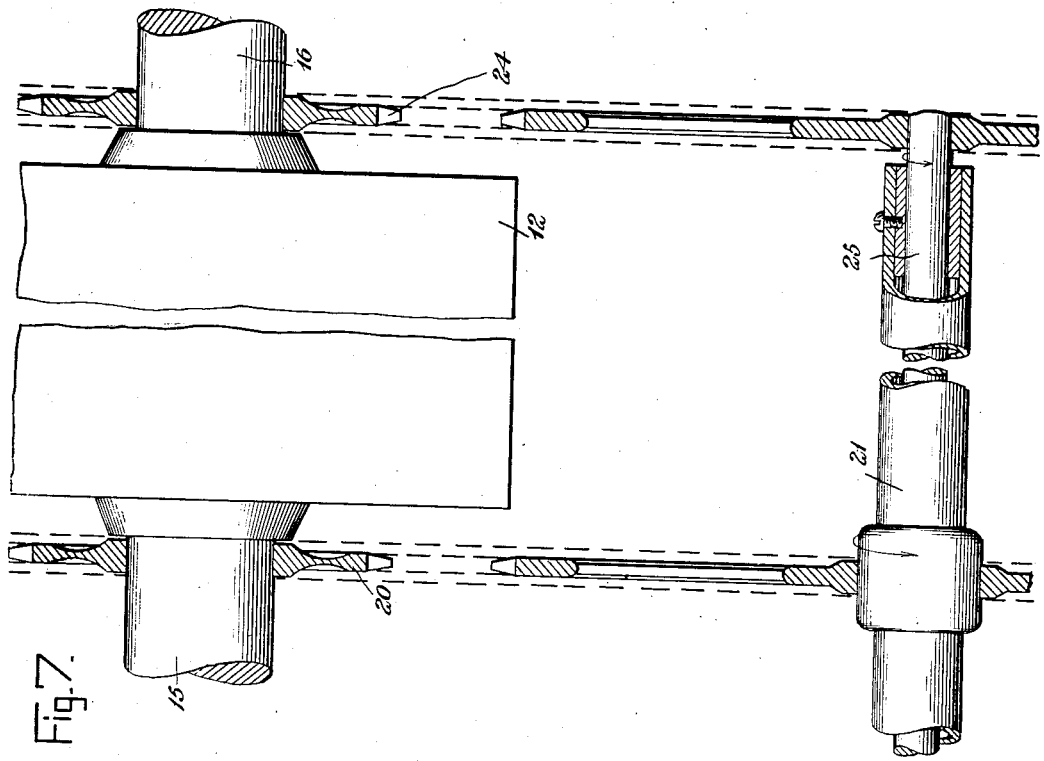
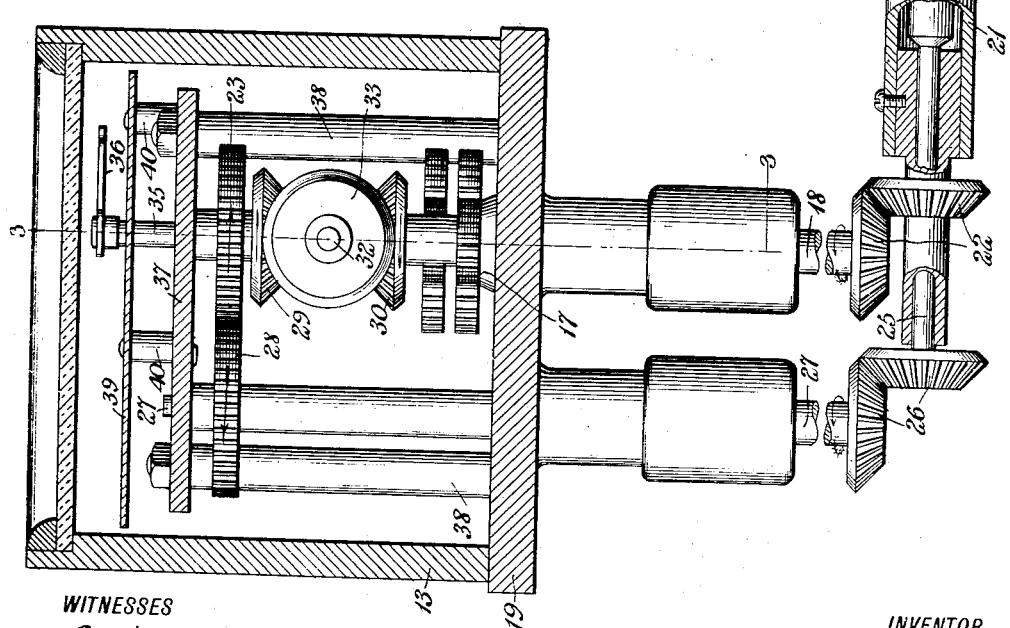
WITNESSES
INVENTOR
Frederick W. Woodhull
BY
ATTORNEYS

UNITED STATES PATENT OFFICE.

FREDERICK W. WOODHULL, OF ALHAMBRA, CALIFORNIA.

TRANSMISSION-GEAR INDICATOR.

1,161,572.  Specification of Letters Patent.  Patented Nov. 23, 1915.

Application filed November 1, 1913. Serial No. 798,681.

*To all whom it may concern:*

Be it known that I, FREDERICK W. WOODHULL, a citizen of the United States, and a resident of Alhambra, in the county of Los Angeles and State of California, have invented a new and Improved Transmission-Gear Indicator, of which the following is a full, clear, and exact description.

This invention relates to change speed gearing and has particular reference to the shifting of such gearing for the purpose of changing from one speed to another with absolute precision and therefore avoiding numerous objections commonly found in such machinery such, for instance, as harsh clattering of the clutch mechanism and danger of breakage of the clutch elements due to contact when the several parts are operating at different speeds.

Among the objects, therefore, of this invention is to provide a means within view of the driver and operated directly and positively from the several parts of the transmission mechanism which are subjected to varying speed ratios, such means serving to indicate to the driver the condition of the transmission mechanism and therefore enabling him to shift the clutches at such time as will be favorable. It follows, therefore, from this fact that he will have no excuse for attempting to shift the clutch from a higher to a lower speed unless the relative speeds of the clutch elements are favorable for such shifting.

The foregoing and other objects of the invention will hereinafter be more fully described and claimed and illustrated in the drawings forming a part of this specification in which like characters of reference indicate corresponding parts in all the views, and in which—

Figure 6:
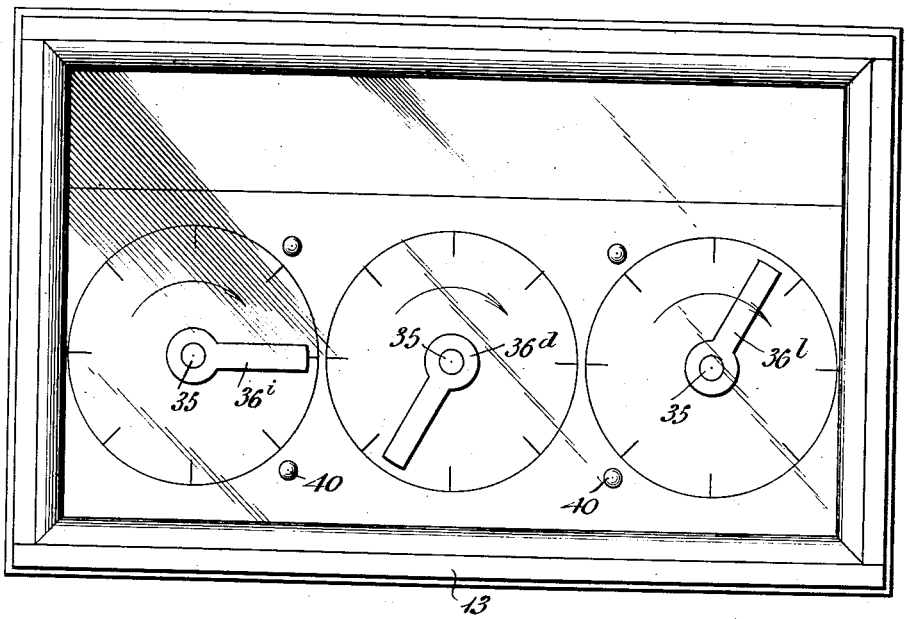

Figure 1 is a vertical longitudinal section, somewhat diagrammatic, of a motor driven vehicle to which my invention is applied, the view of the attachment being in elevation; Fig. 2 is a view corresponding to Fig. 1, but at right angles thereto and substantially on the line 2—2 of Fig. 1; Fig. 3 is a vertical section through the indicator casing and substantially on the line 3—3 of Fig. 7; Fig. 4 is a plan view indicating the relation of the upper series of gears to one another, the view being somewhat fragmentary and diagrammatic but as though taken from the plane on the line 4—4 of Fig. 3; Fig. 5 is a view somewhat similar to Fig. 4, but on a lower plane, on the line 5—5 of Fig. 4 and showing the lower series of gears; Fig. 6 is a top view of the indicator casing; Fig. 7 is a vertical sectional view through the indicator casing substantially on the line 7—7 of Fig. 3, and also including fragments of the transmission casing and several power transmitting devices; and Fig. 8 is a detail of one of the differential gear hubs of the indicator.

The several parts of the device may be made of any suitable materials, and the relative sizes and proportions, as well as the general design of the mechanism, may be varied to a considerable extent without departing from the spirit of the invention hereinafter more fully set forth and specifically claimed.

This invention may be carried out in numerous specific ways and while I have shown herein one of such ways it will be obvious to those skilled in the art that the mechanical details may be varied in numerous particulars within the scope of the invention as covered by the claims at the end of this specification.

Considering Fig. 1 as indicative of an automobile including a body 10, a motor 11 and a change speed transmission casing 12, my improvement includes an indicator casing 13 arranged preferably adjacent the dashboard 14 and within convenient view of the driver when seated within the body.

In the illustration of the invention herein shown I contemplate the employment of a device designed for use in connection with a transmission device including three different forward speeds and identified as a high speed or direct drive or that drive in which the motor shaft is clutched for rotation in unison with the transmission shaft, a low speed having a ratio with the high speed as 1 to 4, and an intermediate speed having a ratio with the high speed as 1 to 2. In this connection I wish to state, however, that the invention is adaptable for use in connection with any other form of speed ratios or transmission change speed gearing, and the ratios just referred to are to be understood as illustrative and not in any sense of a limiting nature.

For the construction suggested as an illustration, the indicator casing includes three dials or three separate pointers operating over as many parts of the same dial, as shown in Fig. 6, and these dials pertain to the several speed ratios incident to the transmission. At any convenient place as, for instance, within the indicator casing, is arranged a system of gearing providing speed ratios corresponding precisely to the speed ratios of the transmission gearing in the casing 12, and the means for controlling the operation of the indicator casing gearing are connected directly to and positively operated by different parts of the power mechanism such, for instance, as the motor shaft and the transmission shaft or other parts which typify the variable relative speeds of the motor and the vehicle.

In carrying out this illustration more specifically, I indicate at 15 what may be considered the motor shaft leading into the transmission casing 12 and at 16 the transmission shaft leading from the transmission casing to the driving axle of the vehicle. Within the casing 13 is arranged a driving pinion 17 connected to or driven in any suitable manner from a shaft 18 extending upwardly through the bottom 19 of the casing. Depending upon the type of vehicle equipped with the invention and other circumstances, the shaft 18 may be of any desired form, but in any event is driven positively from the motor shaft 15 herein illustrated as by means of sprocket gearing 20 leading from the motor shaft to a sleeve or hollow shaft 21 to which the aforesaid shaft 18 is connected by miter gears 22. The pinion 17 will therefore be understood as representing the speed of the motor and always has a speed at a definite fixed ratio to that of the motor shaft.

Another driving gear 23 within the casing and arranged preferably in vertical alinement with the pinion 17 is adapted to be driven directly and positively in harmony with the transmission shaft 16. The connections which I show for convenience of illustration include sprocket gearing 24 leading from the transmission shaft to a countershaft 25 journaled within the aforesaid hollow shaft 21 and having miter gears 26 serving to drive a shaft 27 to the upper end of which is connected a gear 28 meshing with the driving gear 23. It will be observed, therefore, that the mechanism shown provides that the motor shaft 15 and the shafts 21 and 18 connected thereto always rotate in the same direction, at the same or different speeds, however, as the transmission shaft 16 and the shafts 25 and 27 driven therefrom. It follows, therefore, that the driving gear 23 always rotates around the axis of the pinion 17 in a different direction from said pinion.

Within the casing 13, also, are arranged three sets of differential gears indicated at D, L and I respectively, and pertaining as the letters indicate to the direct, low and intermediate transmission speed gears. Each of these differential gears includes upper and lower miter gears 29 and 30 respectively, the rotation of which is controlled from the driving gears 23 and 17 respectively. Each differential gear also includes a hub 31 having outwardly extending trunnions 32 for idler gears 33 connecting the aforesaid gears 29 and 30 in pairs. Said hub also has a stud 34 extending downwardly therefrom and journaled in the base 19 of the casing and around which the lower gear 30 rotates. A shaft 35 also extends upwardly from the hub 31 through the upper gear 29 and carries at its upper end a pointer 36, the several pointers 36 being distinguishable on Fig. 6 by the characters 36$^l$, 36$^d$ and 36$^i$ corresponding to the low, direct and intermediate speeds.

The several shafts 35 and the gears rotating therearound are supported in place by means of a plate 37 held in proper spaced relation above the base 19 by means of posts 38 shown in this instance as being substantially close to the corners of the casing. The dial plate 39 is supported just above the plate 27 by several spacing studs 40.

Referring to Figs. 3 and 5, the driving pinion 17 meshes with and drives in the same direction a pair of gears 41 and 42. A pinion 41' is secured to the gear 41 and in turn drives a gear 43 secured to the gear 30 of the low speed differential. The train of gears 17, 41, 41' and 43 are designed in the instance referred to to provide an angular speed ratio between the shaft 18 and the gear 43 of 4 to 1. Likewise the pinion 17 is connected to the lower gear 30 of the intermediate speed differential by means of a gear 42' secured to the gear 42 and meshing in turn with a gear 44 secured to said gear 30, the speed ratio between the pinion 17 and the gear 44 being as 2 to 1. The pairs of gears 41, 41' and 42, 42' are journaled respectively upon fixed studs 45 secured to the base 19.

Referring now to Figs. 3 and 4, I provide gears 46 and 47 of the same size as the driving gear 23 and arranged respectively upon the shafts 35 of the low and intermediate speed differentials. These gears 46 and 47 are driven from the gear 23 and in the same direction therewith by means of idlers 46' and 47' respectively journaled upon studs 48 extending downwardly from the plate 37.

When the direct driving clutch is in operation and the shafts 15 and 16 are rotating in unison, the gears 17 and 23 will be operated precisely at the same angular velocity, and since their directions of rotation are opposite to each other, the pointer 36$^d$ controlled therefrom through the hub D and the idlers 33 will remain stationary. With the parts rotating in the directions indicated in Figs. 4, 5 and 7, while the direct speed connection is in operation as just described and the pointer pertaining thereto standing still, the low speed pointer 36¹ will be rotating toward the left or in a direction opposite to the arrow on Fig. 6 and at a speed determined by the differential between the oppositely rotating gears 46 and 43. Likewise at this time the pointer 36¹ will always be rotating toward the left or counter-clockwise but at slower speed than indicated by the pointer 36¹.

On shifting the transmission clutch from the direct drive to the low speed, for instance, with the indicator conditions as just described, the driver will shift his clutch to neutral and increase the speed of his motor with respect to that of his car which will have the immediate effect of increasing the speed of the gear 43 with respect to the gear 46 and cause the retardation of movement of the pointer 36¹. When such pointer comes to a standstill the driver will know that the precise relative speeds of the motor shaft and transmission shaft will be reached to make a smooth and direct connection with his clutch between the motor shaft and the transmission shaft. When this connection has been made, the pointer 36¹ will stand still, and the pointer 36ᵈ will be spinning around toward the right or in the direction of the arrow on Fig. 6 at a comparatively high rate of speed and the pointer 36¹ will be turning in the same direction at one half the speed of the pointer 36ᵈ. The process of shifting the clutch from any speed to any other speed is effected in the same manner as above described. The specific description of rotation of the pointers above given is intended rather as an explanation of the mechanism than as an essential statement of the principle of the invention. It is to be observed that the essential point of the mechanism herein set forth is that the pointer pertaining to the speed desired to be connected for, must be stationary or substantially stationary in order to make the shifting smooth and safe, it being unnecessary and practically undesirable for the driver to observe any other pointer at such time.

Having thus described my invention, I claim as new and desire to secure by Letters Patent:—

1. The combination with a transmission mechanism having transmission gears, of a driving element, a driven element, means for actuating the latter in any one of a plurality of speeds with respect to the former, a plurality of differential gears, one connected on one side, with the driving element to revolve this side of the differential in a given direction, one connected on the other side with the driven element, to revolve this side of the differential in the opposite direction, a train of gears of different ratios connecting one side of all of the differential gears, a train of gears connecting the other side of all of the differential gears, each differential gear having a hub and an indicator secured to it, whereby the moment may be determined when to change the relationship of the said gears in the transmission.

2. The combination with a transmission mechanism, of a driving element, a driven element, means for actuating the latter in any one of a plurality of speeds with respect to the former, a differential gear, means for connecting one side thereof with said driving element, means for connecting the other side with said driven element, a hub for said differential, an indicator carried by said hub, a supplemental differential gear on each side of said first named differential gear, a train of gears of different ratios connecting one of said elements with one side of each of said supplemental differential gears, a train of gears connecting the other of said elements with the other side of said supplemental differential gears, and an indicator secured to each supplemental hub, whereby the moment may be determined to change the relationship of speeds between said elements.

In testimony whereof I have signed my name to this specification in the presence of two subscribing witnesses.

FREDERICK W. WOODHULL.

Witnesses:
SAM'L. D. MACKINNON,
LAFAYETTE D. WHITE.